No. 681,055. Patented Aug. 20, 1901.
E. J. HICKS.
SAW SET.
(Application filed May 23, 1901.)
(No Model.)

Witnesses
F. L. Orrand
Forsberg Brown

Edgar J. Hicks, Inventor
by E. W. Bradford, Attorney

THE NORRIS PETERS CO., PHOTO-LITHO., WASHINGTON, D. C.

UNITED STATES PATENT OFFICE.

EDGAR J. HICKS, OF INDIANAPOLIS, INDIANA.

SAW-SET.

SPECIFICATION forming part of Letters Patent No. 681,055, dated August 20, 1901.

Application filed May 23, 1901. Serial No. 61,582. (No model.)

*To all whom it may concern:*

Be it known that I, EDGAR J. HICKS, a citizen of the United States, residing at Indianapolis, in the county of Marion and State of Indiana, have invented certain new and useful Improvements in Saw-Sets, of which the following is a specification.

My said invention consists in an improved form of anvil for saw-sets, whereby the same is adapted to impart to the teeth not only the set desired, but a shape most advantageous in use, while being at the same time comparatively inexpensive, as will be hereinafter more fully described and claimed.

Figure 1:
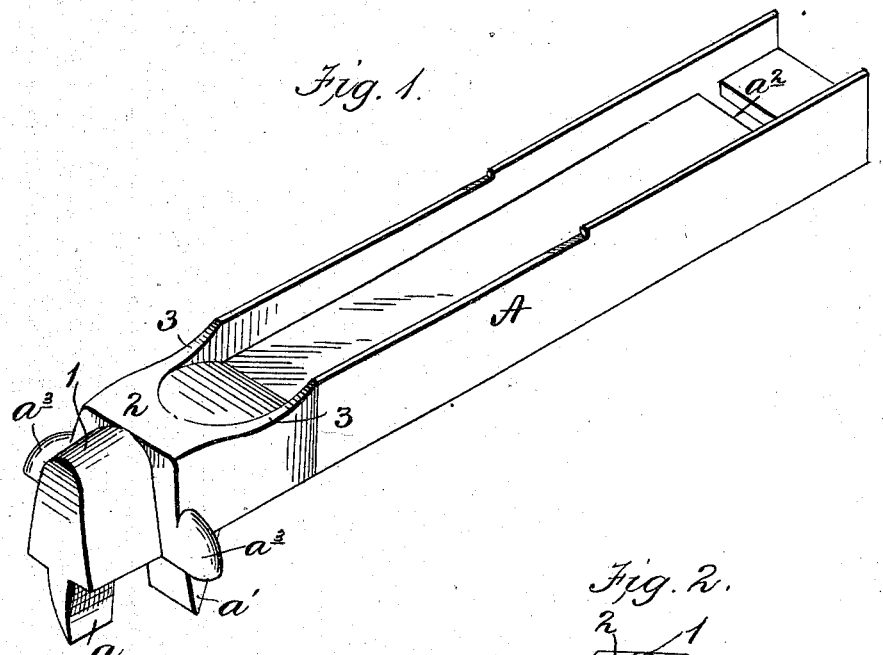
Figure 2:
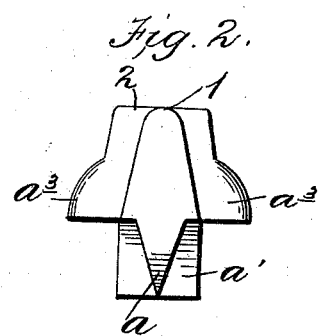
Figure 3:
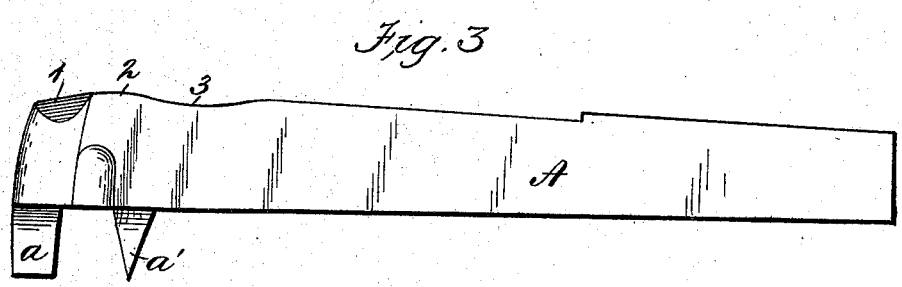

Referring to the accompanying drawings, which are made a part hereof and on which similar references characters indicate similar parts, Figure 1 is a perspective view of a saw-set embodying my said invention; Fig. 2, a front elevation, and Fig. 3 a side elevation, thereof.

Said tool comprises a block A, preferably of cast metal, having dogs $a$ and $a'$, which may be driven into a block or bench for securing the tool in place. It is of appropriate form, preferably having side flanges to afford the required strength and rigidity, with their top edges of a form to also serve as a rest for the saw. A slot $a^2$ may also be formed near its rear end, through which another fastening device may be driven into the part on which it is mounted, and transversely-projecting wings $a^3$ may be formed on each side of its front end to afford a wide rest for the anvil portion and render the tool rigid when in use. The operative face or anvil portion is formed at the front end, as shown, consisting of a downwardly-tapered outer end with a top surface 1 convex in cross-section, narrowing toward its point. Behind this is a transversely-flat surface 2, slightly rounded or convex in longitudinal section, and behind this a hollowed-out portion 3, extending transversely across the block. From this portion the tops of the side flanges extend back at the angle desired to serve as the rest or support for the saw while being operated upon.

In operation the saw is laid flat upon the side flanges of the block A, with the point of the tooth to be set and shaped projecting over the point 1 of the anvil portion, the center of the tooth directly above the apex of said portion. A blow upon said tooth with a hammer will then operate to set the tooth and also bend it slightly in cross-section, giving it a "dished" shape on its face, which affords quite an advantage to the saw in cutting qualities and fitness for being maintained in good order. By reason of the depression 3 behind the anvil portion 2 the blade of the saw is permitted to give or spring just behind the tooth when the blow is given and the danger of cracking or bursting thus lessened.

Having thus fully described my said invention, what I claim as new, and desire to secure by Letters Patent, is—

1. A tool for setting and shaping saw-teeth, comprising a block having a point tapering and narrowing toward its end and with a convex top surface, a portion behind said point somewhat convex in longitudinal section, and a depression behind this portion, with sides formed to serve as rests extending rearward therefrom, substantially as set forth.

2. A saw-set comprising a block having suitable securing parts, with sides for a rest for the saw, and an anvil formed with a narrowing downwardly-tapered point with convex top, and a portion behind said point substantially straight transversely but convex longitudinally, substantially as set forth.

3. A saw-set comprising a block formed with rests for the saw and having an anvil with a tapered convex top at its point, a flat portion behind said tapered portion, and a depression behind said flat portion, substantially as set forth.

In witness whereof I have hereunto set my hand and seal, at Indianapolis, Indiana, this 21st day of May, A. D. 1901.

EDGAR J. HICKS. [L. S.]

Witnesses:
 H. E. SMOCK,
 D. K. HALL.